(12) United States Patent
Stone et al.

(10) Patent No.: US 12,030,505 B2
(45) Date of Patent: Jul. 9, 2024

(54) VEHICLE OCCUPANT MENTAL WELLBEING ASSESSMENT AND COUNTERMEASURE DEPLOYMENT

(71) Applicant: GM GLOBAL TECHNOLOGY OPERATIONS LLC, Detroit, MI (US)

(72) Inventors: Noah Stone, West Bloomfield, MI (US); Matthew E. Gilbert-Eyres, Rochester Hills, MI (US); Russell A Patenaude, Macomb Township, MI (US); Eric T. Hosey, Royal Oak, MI (US); Kurt Chamberlin, Bristol, RI (US); Vanessa A. Stieneker, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 78 days.

(21) Appl. No.: 17/984,386

(22) Filed: Nov. 10, 2022

(65) Prior Publication Data

US 2024/0157948 A1    May 16, 2024

(51) Int. Cl.
*B60W 40/09* (2012.01)
*B60W 30/08* (2012.01)
*B60W 50/14* (2020.01)

(52) U.S. Cl.
CPC .......... *B60W 40/09* (2013.01); *B60W 30/08* (2013.01); *B60W 50/14* (2013.01); *B60W 2540/22* (2013.01); *B60W 2540/30* (2013.01); *B60W 2556/45* (2020.02)

(58) Field of Classification Search
CPC ...... B60W 40/09; B60W 30/08; B60W 50/14; B60W 2540/22; B60W 2540/30; B60W 2556/45
See application file for complete search history.

(56) References Cited

U.S. PATENT DOCUMENTS

| | | | |
|---|---|---|---|
| 2006/0235753 A1* | 10/2006 | Kameyama | G06Q 30/0201 705/15 |
| 2015/0243172 A1* | 8/2015 | Eskilson | H04L 67/12 701/1 |
| 2015/0302718 A1* | 10/2015 | Konigsberg | A61B 5/18 340/576 |
| 2018/0009442 A1* | 1/2018 | Spasojevic | A61B 5/0205 |
| 2019/0184998 A1 | 6/2019 | Zheng | |
| 2020/0238933 A1* | 7/2020 | Sobhany | B60K 35/00 |

* cited by examiner

*Primary Examiner* — Ryan W Sherwin
(74) *Attorney, Agent, or Firm* — Quinn IP Law

(57) ABSTRACT

A wellbeing system configured for assessing a mental wellbeing of a driver while driving the vehicle and deploying a countermeasure in response to a mindfulness level of the driver being beyond a desired range. The countermeasure may be configured to mitigate a probability of a mental wellbeing of the driver undesirably impacting operation of the vehicle.

10 Claims, 2 Drawing Sheets

VEHICLE OCCUPANT MENTAL WELLBEING ASSESSMENT AND COUNTERMEASURE DEPLOYMENT

INTRODUCTION

The present disclosure relates to methods and systems for assessing a mental wellbeing of an occupant within a vehicle and correspondingly deploying a personalized countermeasure in an effort to mitigate a probability of the occupant's wellbeing undesirably impacting operation of the vehicle.

An ability for an individual to maintain a healthy degree of mental fitness, wellness, and wellbeing while operating a vehicle may be influential in mitigating a probability of the vehicle becoming involved in an undesirable situation. Some vehicles, like automobiles, may include a driver and a plurality of passengers such that mental duress experienced by the driver and/or the passengers, whether resulting from emotional, psychological, social, or other cognitive stimuli, may induce stress and distraction sufficient to impact an ability of the driver to make decisions, react to external objects and actions, and otherwise operate the vehicle in a desirable manner, or at least as effectively as the driver would otherwise be capable of in the absence of the mental duress.

SUMMARY

Non-limiting aspects of the present disclosure relate to methods and systems for proactively predicting mindfulness levels for an occupant of a vehicle, and based thereon, deploying a countermeasure when the mindfulness levels are outside a normal or desired range in an effort to mitigate a probability of the occupant's wellbeing undesirably impacting operation of the vehicle, such as with the countermeasure recommending the occupant perform a mental health exercise, call a friend or family member, or instantiate a therapy session with a trained professional.

One non-limiting aspect of the present disclosure relates to a personalized system for assessing a mental wellbeing of a driver within a vehicle and deploying a countermeasure in an effort to mitigate a probability of the mental wellbeing of the driver undesirably impacting operation of the vehicle. The system may include a data module configured to collect a plurality of data elements for the driver, optionally with the data elements representing influences on the driver while operating the vehicle, a wellbeing module configured to determine a mindfulness level for the driver as a function of the data elements, optionally with the mindfulness level representing a mental wellbeing of the driver while operating the vehicle, and a countermeasure module configured to deploy a countermeasure for the driver as a function of the mindfulness level, optionally with the countermeasure being configured to mitigate a probability of the mental wellbeing of the driver undesirably impacting operation of the vehicle.

The wellbeing module may determine the mindfulness level as a function a deviation of the data elements from a baseline previously established for the driver. The wellbeing module may be configured to determine the mindfulness level to correspond with a first level when the deviation is greater than a first amount and less than a second amount, a second level when the deviation is greater than the second amount and less than a third amount, and a third level when the deviation is greater than the third amount.

The countermeasure module may be configured to deploy the countermeasure as a first countermeasure when the mindfulness level is the first level, a second countermeasure when the when the mindfulness level is the second level, and a third countermeasure when the when the mindfulness level is the third level. The countermeasure module may be configured to deploy the first countermeasure as an exercise recommendation for the driver to engage in a wellness exercise using one or more systems onboard the vehicle, to deploy the second countermeasure to include a call recommendation for the driver to call an individual offboard the vehicle using a communication system onboard the vehicle, and to deploy the third countermeasure as an automated phone call to a trained advisor offboard the vehicle using a communication system of the vehicle.

The countermeasure module may be configured to deploy the countermeasure through one or more systems onboard the vehicle.

The countermeasure module may be configured to deploy the countermeasure through a wireless device associated with the driver.

The data module may be configured to collect at least a portion of the data elements to represent influences associated with driver behavior, alerts, and vehicle telemetry, optionally including at least a portion of the data elements to represent influences associated with vehicle stop-start frequency, time of day, erratic driving behaviors, hard braking, hard accelerating, hard cornering, forward collision notification, tailgating and lane assist alerts, weather data, emergency vehicle or public safety alerts, in-vehicle motion and vibration sensor data, navigation delays, excessive honking, collision detection, appointment schedule, vehicle fuel level, road construction, obeyance of road signage, in-vehicle microphone sound data, driver or passenger behavior alerts, steering wheel grip strength, hazard light engagement, and geographic location.

One non-limiting aspect of the present disclosure relates to a personalized system for assessing a mental wellbeing of an occupant within a vehicle and deploying a countermeasure in an effort to mitigate a probability of the mental wellbeing of the occupant undesirably impacting operation of the vehicle. The system may include a data module configured to collect a plurality of data elements for the occupant, optionally with the data elements representing influences on the occupant while the vehicle is in operation, a wellbeing module configured to determine a mindfulness level for the occupant as a function of the data elements, optionally with the mindfulness level representing a mental wellbeing of the occupant while the vehicle is in operation, and a countermeasure module configured to deploy a countermeasure in response to the mindfulness level being outside of a normal range for the occupant, optionally with the countermeasure being configured to mitigate a probability of the mental wellbeing of the occupant undesirably impacting operation of the vehicle.

The wellbeing module may determine the mindfulness level to be outside of the normal range when the data elements deviate by more than an acceptable amount from a historical average, a normal range, or a desired range previously set for the occupant.

The countermeasure module may be configured to deploy the countermeasure to a driver of the vehicle using one or more systems included onboard the vehicle.

The countermeasure module may be configured to deploy the countermeasure to a driver of the vehicle using wireless instructions transmitted to a wireless device associated with the driver.

One non-limiting aspect of the present disclosure relates to a safety system for a vehicle. The system may include an advanced driver assistance system (ADAS) configured for autonomously controlling one or more driving functions of the vehicle according to telemetry data collected while the vehicle is being driven, optionally with the telemetry data being at least partially collected with a telemetry system onboard the vehicle, and a wellbeing system configured for assessing a mental wellbeing of a driver while driving the vehicle and deploying a countermeasure in response to a mindfulness level of the driver being beyond of a desired range, optionally with the countermeasure being configured to mitigate a probability of a mental wellbeing of the driver undesirably impacting operation of the vehicle.

The wellbeing system may include a data module configured to collect a plurality of data elements for the driver, optionally with the data elements representing influences on the driver while the vehicle is in operation, a wellbeing module configured to determine the mindfulness level for the driver as a function of the data elements, optionally with the mindfulness level representing the mental wellbeing of the driver, and a countermeasure module configured to deploy the countermeasure.

The wellbeing module may determine the mindfulness level to be outside of the desired range when the data elements deviate by more than an acceptable amount from a baseline previously set for the driver.

The wellbeing system may be configured to deploy the countermeasure without controlling the driving functions.

The wellbeing system may be configured to deploy the countermeasure to autonomously control one or more non-driving functions of the vehicle.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
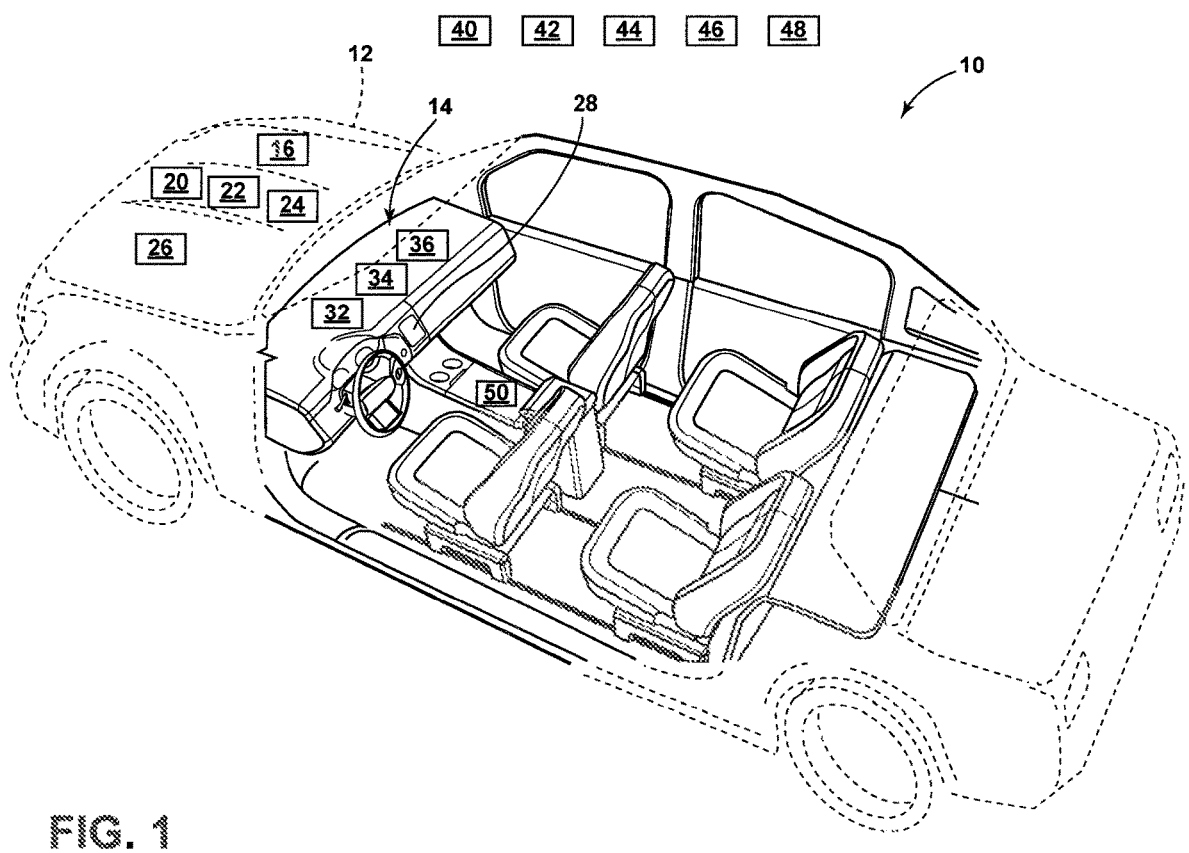
FIG. 1 illustrates a schematic view of a safety system for a vehicle in accordance with one non-limiting aspect of the present disclosure.

FIG. 1 illustrates a schematic view of a safety system 10 for a vehicle 12 in accordance with one non-limiting aspect of the present disclosure. The safety system 10 is described for exemplary purposes as including a wellbeing system 14 and an advanced driver assistance system (ADAS) 16. The ADAS 16 may be configured, as one skilled in the art will appreciate, to facilitate autonomously controlling one or more driving functions of the vehicle 12, such as to avoid collisions, deploy airbags, and perform other autonomous activities. The wellbeing system 14 may be configured in contrast and in accordance with the present disclosure for proactively predicting mindfulness levels for one or more occupants (not shown) of the vehicle 12, and based thereon, deploying a countermeasure in the event the mindfulness levels are outside a normal or desired range. The countermeasure may be correspondingly implemented in an effort to mitigate a probability of the occupant's wellbeing undesirably impacting operation of the vehicle 12. The ADAS 16 is described as being included as part of the safety system 10 for exemplary and non-limiting purposes as the present disclosure fully contemplates the vehicle 12 omitting the ADAS 16 and/or the safety system 10 being comprised solely of the wellbeing system 14.

The inclusion of the ADAS 16, however, may be beneficial in demonstrating the improvements and advantageous capabilities of the wellbeing system 14 to facilitate mitigating a probability of the occupant's wellbeing undesirably impacting operation of the vehicle 12 without the wellness system having to correspondingly control or otherwise direct the driving functions of the vehicle 12, i.e., the countermeasures may be implemented without controlling the driving functions by instead autonomously controlling or otherwise deploying one or more non-driving functions of the vehicle 12. The wellbeing system 14 at least according to one aspect of the present disclosure, may be independent of or capable of operating independently of the ADAS 16 such that the wellbeing system 14 may be implemented without having to undertake the complexity, redundancy, and other reliability requirements associated with autonomously controlling driving functions of the vehicle 12, e.g., the wellness system may be a non-critical vehicle 12 system and/or incapable of autonomous controlling driving functions of the vehicle 12. The differentiation between the ADAS 16 and the wellbeing system 14 is not intended to be limiting as the present disclosure fully contemplates the wellbeing system 14 in some embodiments being configured to autonomously control driving functions of the vehicle 12.

The ADAS 16 may be configured to provide a level of autonomous vehicle control, optionally with the assistance of telemetry data collected with a telemetry system 20, a radar system 22, a navigation system 24, and the like. The ADAS 16 may include an on-vehicle 12 control system capable of providing a level of driving automation such that a driver of the vehicle 12 need not be actively involved in controlling one or more driving or other functions of the vehicle 12. The ADAS 16, for example, may be configured for driving automation of the type whereby dynamic driving and vehicle 12 operations, including some level of automatic control or intervention with steering, acceleration, and/or braking, may be implemented, such as by way of non-limiting examples, to automate adaptive cruise control, lane-change warning, intervention and control, automatic parking, acceleration, braking, lane guidance and lane keeping operation, steering assist, object avoidance, parking assistance, speed and acceleration, lateral motion, and/or other driving functions.

The vehicle 12 may include a communication system 26 configured to assist the ADAS 16 and the wellbeing system 14 with the use of wireless, onboard and offboard communications, including vehicle 12-to-vehicle 12 (V2V) and/or vehicle 12-to-everything (V2X) communications. The vehicle 12 may additionally include an infotainment system 28 capable of interacting or otherwise engaging with the vehicle 12 occupants, such as through messaging, images, video, and other media transmitted through or received from human-machine interfaces (HMI), displays, speakers, microphones, internal cameras, etc. included within the vehicle 12, as one having ordinary skill in the art will appreciate. The vehicle 12 may also include additional systems and/or subsystems configured to facilitate the operations and processes described herein, particularly those associated with the processes and activities of the wellbeing system 14, and as such, and in the event the corresponding systems are not specifically referenced or illustrated, the present disclosure fully contemplates those systems being included as part of the vehicle 12, the wellbeing system 14, and/or in communication therewith.

The wellbeing system 14 may include additional or alternative configurations and is predominantly described for exemplary and non-limiting purposes as including a data module 32, a wellbeing module 34, and a countermeasure module 36. The data, wellbeing, and countermeasure modules 32, 34, 36 may be standalone constructs capable of operating independently of each other, may be collectively included as part of a singular or standalone controller, and/or may be otherwise configured to facilitate the attendant operations, processes, etc. described herein. The modules 32, 34, 36 are shown as being at least partially onboard the vehicle 12 for exemplary purposes as the present disclosure fully contemplates the modules being offboard the vehicle 12, such as at a back office operable to exchange wireless control instructions with the vehicle 12. The modules 32, 34, 36 may operate according to a plurality of non-transitory instructions stored on a computer readable storage medium, which when executed with a processor, may be sufficient to facilitate the calculation, data collections, communications, calculations, etc. associated with proactively predicting mindfulness levels for vehicle 12 occupants, and based thereon, deploying a countermeasure in the event the mindfulness levels are outside a normal or desired range in an effort to mitigate a probability of the occupant's wellbeing undesirably impacting operation of the vehicle 12.

The data module 32 may be configured to collect a plurality of data elements for one or more of the vehicle 12 occupants to represent influences on the occupants. The data module 32 may collect the data elements from a number of sources, including sources onboard and offboard the vehicle 12. The data elements, for example, may be collected from the telemetry system 20, the ADAS 16, the communication system 26, the infotainment system 28, the navigation system 24, etc. onboard the vehicle 12 as well as from an alert system 40, a back office system 42, a roadside system 44, a global positioning system 46, a wireless networking system 48, etc. offboard the vehicle 12. The data module 32 may be configured to continuously track, monitor, or otherwise obtain data elements for the occupants, predominantly while occupants are within or operating the vehicle 12, and optionally when the occupants are outside of the vehicle 12, e.g., the data module 32 may be configured to collect location, biometric, and other information for the occupants when outside the vehicle 12 using wearable devices, mobile phones, smart devices, and the like. The data module 32 may collect data elements to generate baselines, normal ranges, and/or desired ranges for occupants, e.g., values, metrics, and other information comprising the data elements, may be tabulated, and tracked over time, optionally relative to attendant circumstances, environmental conditions, etc., to effectively establish parameters useful in assessing the mental wellbeing of the occupants.

The wellbeing module 34 may be configured to determine a mindfulness level or more of the occupants as a function of the data elements associated therewith. The mindfulness level may be used to represent a mental wellbeing of the associated occupant while the vehicle 12 is operation. The wellbeing module 34 may be configured to determine the mindfulness level as a function of a deviation of the data elements for the associated occupant relative to baseline, a normal range, a desired range, or other reference associated with adequate mental wellbeing or other circumstances associated with the occupant's mental health, e.g., an emotional, psychological, social, and other cognitive state of mind usual for the occupant, being considered as typical and/or associated with a mental state that is unlikely to undesirably impact operation of the vehicle 12. The capability of the data module 32 to relate the mindfulness level to a determination of normalcy for the occupant may be beneficial in personalizing a determination of the mindfulness level specifically to the occupant. While the present disclosure fully contemplates an arbitrary or non-personalized baseline, e.g., a singular or a one-size-is-all standard for comparison with the data elements, the personalization of the baseline is believed to improve the accuracy of at which the occupant is determined to be under mental duress or otherwise affected in a way that may undesirably impact operation of the vehicle 12.

The countermeasure module 36 may be configured to deploy a corrective action, a mitigation strategy, or a countermeasure as a function of the occupant experiencing mental duress. The countermeasure may be deployed according to the mindfulness level determined for the occupant so as to mitigate a probability of the occupant's mental wellbeing undesirably impacting operation of the vehicle 12. The countermeasure may be implemented through one or more systems onboard vehicle 12, through a wireless device 50 or other device associated with one of the occupants, through roadside signage, e.g., displaying messaging to the vehicle 12 traveling thereby, etc. The countermeasure module 36 may be configured to generate multiple countermeasures, optionally with each countermeasure being concurrently deployed. In the case of the mental distress being experienced by a passenger, the countermeasure may be deployed in an effort to calm down the passenger before the passenger effects or impacts a driver's capability to operate the vehicle 12 in a desirable manner and/or the countermeasure may be deployed to the driver in anticipation of occupant's mental distress potentially impacting the driver. In the case of the mental distress being experienced by the driver, which may also result from a passenger stressing the driver, the countermeasure may be deployed directly to the driver and/or to the driver and the passenger stimulating the driver.

Figure 2:
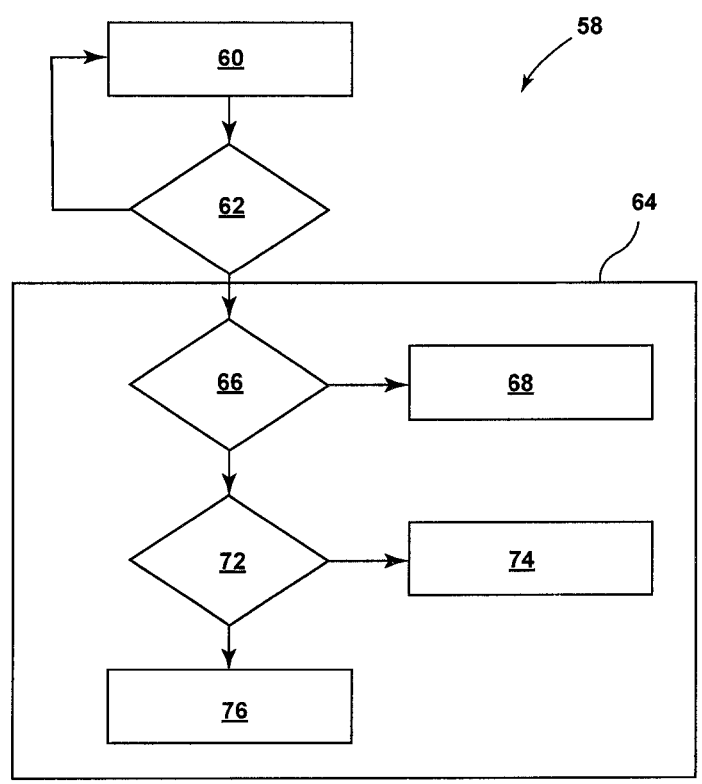
FIG. 2 illustrates a flowchart of a method for assessing a mental wellbeing of an occupant within a vehicle in accordance with one non-limiting aspect of the present disclosure.

FIG. 2 illustrates a flowchart 58 of a method for assessing a mental wellbeing of an occupant within a vehicle 12 and deploying a countermeasure in an effort to mitigate a probability of the occupant's mental wellbeing impacting operation of the vehicle 12 in accordance with one non-limiting aspect of the present disclosure. As supported above, the present disclosure contemplates deploying one or more countermeasures in an effort to mitigate a probability of an occupants mental distress affecting operation of the vehicle 12. The method is predominantly described with respect to assessing the wellbeing and deploying the countermeasure for a driver of the vehicle 12 for exemplary purposes in order to demonstrate advantageous capabilities of the present disclosure to directly influence mental health of the driver by calming, pacifying, or otherwise assisting in drawing the driver out of a cognitive situation where an ability of the driver to make decisions, react to external objects and actions, and otherwise operate the vehicle 12 in a desirable manner, or at least as effectively as the driver would otherwise be capable of in the absence of the mental duress, may be less than desired. The method also contemplates countermanding mental distress for the passengers, optionally in addition to or in place of the driver.

Block 60 relates to a data collection process for collecting a plurality of data elements for the driver, which may be implemented in the manner described above with the data module 32. The data collection process may include requesting, retrieving, monitoring, or otherwise collecting the data elements from sources onboard and offboard the vehicle 12. The data elements may be collected to facilitate representing influences on the driver, particularly while operating, driving, or otherwise being charged with maintaining desired usage of the vehicle 12. The data elements, for example, may be associated with representing those influences according to or based on vehicle stop-start frequency, time of day, erratic driving behaviors, hard braking, hard accelerating, hard cornering, forward collision notification, tailgating and lane assist alerts, weather data, emergency vehicle or public safety alerts, in-vehicle motion and vibration sensor data, navigation delays, excessive honking, collision detection, appointment schedule, vehicle fuel level, road construction, obeyance of road signage, in-vehicle microphone sound data, driver or passenger behavior alerts, passenger behavior, steering wheel grip strength, hazard light engagement, geographic location, etc.

Block 62 relates to a mindfulness assessment process for assessing a mental wellbeing of the driver, which may be implemented in the manner described above with the wellbeing module 34. The mindfulness assessment process may include comparing or otherwise determining a deviation of the data elements collected while the driver is operating the vehicle 12 to a baseline, a historical average, or a normal range for the driver. The amount of deviation, if any, may be used to quantify the driver's current mental state relative to the driver's typical or usual mental state while previously driving the vehicle 12 under normal or non-stress inducing circumstances. The mindfulness assessment process may include determining a mindfulness level for the driver according to the amount of deviation. The mindfulness level, for example, may be considered as a zero level or baseline level in the event the deviation is less than a first amount, which may correspond with a desired mental state of the driver whereupon Block 60 may be returned to continue monitoring for any change in the driver's wellbeing.

Block 64 relates to a countermeasure process for deploying a counter measure in response to Block 62 determining the mindfulness level to be outside of the baseline range, which may occur when the deviation is greater than the first amount. Block 66 relates to a first level process for determining whether the mindfulness level corresponds with a first level, which may correspond with the deviation being greater than the first amount and less than a second amount. Block 68 relates to deploying a first countermeasure in response to determining the mindfulness level to correspond with the first level. The first countermeasure may correspond with the countermeasure module 36 deploying an exercise recommendation for the driver to engage in a wellness exercise, optionally using or through one or more systems onboard the vehicle 12 or the wireless device 50 associated with the driver. The wellness exercise, for example, may include using audio and/or video capabilities of the vehicle 12 to facilitate guiding the driver through a mental relaxation exercise, such as a breathing program, which the driver may optionally perform while driving the vehicle 12 and without interrupting the driving functions.

Block 72 relates to a second level process for determining whether the mindfulness level corresponds with a second level, which may correspond with the deviation being greater than the second amount and less than a third amount. Block 74 relates to deploying a second countermeasure in response to determining the mindfulness level to correspond with the second level. The second countermeasure may correspond with the countermeasure model module deploying a phone call offer or recommendation for the driver to call a friend or family member, which may be identified ahead of time and stored in a user profile, with the hope of that individual being able to improve the driver's mental wellbeing. The phone call may optionally be made using or through the communication onboard the vehicle 12 and/or the wireless device 50 associated with the driver. The driver may accept the offer, such as by depressing a button included on the steering wheel or actuating an acceptance through the wireless device 50, whereupon the communication system 26 of the vehicle 12 or the wireless phone 50 may call the desired individual offboard the vehicle 12, which may optionally occur while driving the vehicle 12 and without interrupting the driving functions.

Block 76 relates to deploying a third countermeasure in response to determining the mindfulness level to correspond with a third level, which may correspond with the deviation being greater than the third amount. The third countermeasure may correspond with the countermeasure model module autonomously initiating an automated phone call to a trained advisor offboard of the vehicle 12. The automated phone call may be made without an acceptance or acquiesce of the driver in order to connect the driver with an individual, such as a therapist or a psychologist, who may be able to engage the driver in a conversation with the intention of improving the driver's mental wellbeing in a clinical manner. The automated phone call may made through the communication onboard the vehicle 12 and/or the wireless device 50 associated with the driver, such as through a call to the back office 42 or a service associated therewith, e.g., OnStar. The third countermeasure may optionally occur while driving the vehicle 12 and without interrupting the driving functions, however, the present disclosure fully contemplates the third countermeasure optionally including implementing control over one or vehicles functions, such as suggesting to through the infotainment system 28 that the driver slow the vehicle or pullover and/or to autonomously control the vehicle 12 to a support or an assistance center where the driver may seek additional mental health care.

As supported above, the present disclosure relates leveraging proactive insights from monitoring driver behavior, vehicle telematics, surrounding alerts (IPAWS data source, weather, emergency alerts; using OnStar's Alerts Platform), traffic patterns, in-vehicle audio/visual cues (internal/external radar, microphones, interior cameras) and related vehicle components, etc. to assess when a driver's or other occupant's mental wellbeing may be under unusually high duress whereupon the present disclosure may implement tactics, countermeasures, and other mitigations actions in an effort to mitigate the influence thereof, and option improve the mental wellbeing of at least the driver. The countermeasure may include, for example, utilizing systems and resources available through the vehicle to proactively deploy a specially trained live advisor, contact a friend/loved one to help ease a driver's frustration, and/or offer wellness exercises to balance the driver's mental health. The present disclosure may be used to continuously monitor driver behavior and related data points, which can be referenced for the larger driver behavior platform (OnStar Smart Driver) or Connected Teen Driver. Sporadic changes in unsafe driving behavior will escalate how much data the vehicle may detect before intervening, for example a low-level collision. In addition, using OnStar's Alerts Platform, information related to nearby severe weather events, incoming emergency vehicles (ambulances, for example) and other potentially stress-inducing events will be interpreted. Each data point would may be assigned a value that, if detected, would be added to the overall "Driver's Mental Wellbeing Level." Once this level passes a certain value, the system would deploy the desired countermeasure.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A personalized system for assessing a mental wellbeing of a driver within a vehicle and deploying a countermeasure in an effort to mitigate a probability of the mental wellbeing of the driver undesirably impacting operation of the vehicle, comprising:
    a data module configured to collect a plurality of data elements for the driver, the data elements representing influences on the driver while operating the vehicle;
    a wellbeing module configured to determine a mindfulness level for the driver as a function of the data elements, the mindfulness level representing a mental wellbeing of the driver while operating the vehicle;
    a countermeasure module configured to deploy a countermeasure for the driver as a function of the mindfulness level, the countermeasure being configured to mitigate a probability of the mental wellbeing of the driver undesirably impacting operation of the vehicle;
    wherein the wellbeing module determines the mindfulness level as a function of a deviation of the data elements from a baseline previously established for the driver;
    wherein the wellbeing module is configured to determine the mindfulness level to correspond with a first level when the deviation is greater than a first amount and less than a second amount, a second level when the deviation is greater than the second amount and less than a third amount, and/or a third level when the deviation is greater than the third amount;
    wherein the countermeasure module is configured to deploy the countermeasure as a first countermeasure when the mindfulness level is the first level, a second countermeasure when the mindfulness level is the second level, and/or a third countermeasure when the mindfulness level is the third level; and
    wherein the countermeasure module is configured to deploy:
        the first countermeasure as an exercise recommendation for the driver to engage in a wellness exercise using one or more systems onboard the vehicle;
        the second countermeasure to include a call recommendation for the driver to call an individual offboard the vehicle using a communication system onboard the vehicle; and/or
        the third countermeasure as an automated phone call to a trained advisor offboard the vehicle using the communication system.

2. The personalized system according to claim 1, wherein:
    the data module is configured to collect at least a portion of the data elements to represent influences associated with driver behavior, alerts, and vehicle telemetry.

3. The personalized system according to claim 1, wherein:
    the wellbeing module determines the mindfulness level to be outside of a normal range when the data elements deviate by more than an acceptable amount from a historical average, a normal range, or a desired range previously set for the driver.

4. The personalized system according to claim 1, wherein:
    the countermeasure module is configured to deploy the first, second, and/or countermeasures to the driver of the vehicle using one or more systems included onboard the vehicle.

5. The personalized system according to claim 1, wherein:
the countermeasure module is configured to deploy the first, second, and/or countermeasures to the driver of the vehicle using wireless instructions transmitted to a wireless device associated with the driver.

6. The personalized system according to claim 1, wherein:
the vehicle includes an advanced driver assistance system (ADAS) configured for autonomously controlling one or more driving functions of the vehicle according to telemetry data collected while the vehicle is being driven, the telemetry data being at least partially collected with a telemetry system onboard the vehicle; and
the wellbeing module is configured for directing control of the ADAS according to the mindfulness level.

7. The personalized system according to claim 6, wherein:
the wellbeing module is configured to deploy the first, second, and/or countermeasures without controlling the driving functions.

8. The personalized system according to claim 6, wherein:
the wellbeing module is configured to deploy the first, second, and/or countermeasures to autonomously control one or more non-driving functions of the vehicle.

9. A personalized system for assessing a mental wellbeing of a driver within a vehicle and deploying a countermeasure in an effort to mitigate a probability of the mental wellbeing of the driver undesirably impacting operation of the vehicle, comprising:
a data module configured to collect a plurality of data elements for the driver, the data elements representing influences on the driver while operating the vehicle;
a wellbeing module configured to determine a mindfulness level for the driver as a function of the data elements, the mindfulness level representing a mental wellbeing of the driver while operating the vehicle;
a countermeasure module configured to deploy a countermeasure for the driver as a function of the mindfulness level, the countermeasure being configured to mitigate a probability of the mental wellbeing of the driver undesirably impacting operation of the vehicle;
wherein the wellbeing module determines the mindfulness level as a function of a deviation of the data elements from a baseline previously established for the driver;
wherein the wellbeing module is configured to determine the mindfulness level to correspond with a first level when the deviation is greater than a first amount and less than a second amount, a second level when the deviation is greater than the second amount and less than a third amount, and a third level when the deviation is greater than the third amount;
wherein the countermeasure module is configured to deploy the countermeasure as a first countermeasure when the mindfulness level is the first level, a second countermeasure when the mindfulness level is the second level, and a third countermeasure when the mindfulness level is the third level; and
wherein the countermeasure module is configured to deploy the countermeasure through:
one or more systems onboard the vehicle; and/or
a wireless device associated with the driver.

10. A personalized system for assessing a mental wellbeing of a driver within a vehicle and deploying a countermeasure in an effort to mitigate a probability of the mental wellbeing of the driver undesirably impacting operation of the vehicle, comprising:
a data module configured to collect a plurality of data elements for the driver, the data elements representing influences on the driver while operating the vehicle;
a wellbeing module configured to determine a mindfulness level for the driver as a function of the data elements, the mindfulness level representing a mental wellbeing of the driver while operating the vehicle;
a countermeasure module configured to deploy a countermeasure for the driver as a function of the mindfulness level, the countermeasure being configured to mitigate a probability of the mental wellbeing of the driver undesirably impacting operation of the vehicle;
wherein the wellbeing module determines the mindfulness level as a function of a deviation of the data elements from a baseline previously established for the driver;
wherein the wellbeing module is configured to determine the mindfulness level to correspond with a first level when the deviation is greater than a first amount and less than a second amount, a second level when the deviation is greater than the second amount and less than a third amount, and/or a third level when the deviation is greater than the third amount;
wherein the countermeasure module is configured to deploy the countermeasure as a first countermeasure when the mindfulness level is the first level, a second countermeasure when the mindfulness level is the second level, and/or a third countermeasure when the mindfulness level is the third level; and
wherein the data module is configured to collect at least a portion of the data elements to represent influences associated with vehicle stop-start frequency, time of day, erratic driving behaviors, hard braking, hard accelerating, hard cornering, forward collision notification, tailgating and lane assist alerts, weather data, emergency vehicle or public safety alerts, in-vehicle motion and vibration sensor data, navigation delays, excessive honking, collision detection, appointment schedule, vehicle fuel level, road construction, obeyance of road signage, in-vehicle microphone sound data, driver or passenger behavior alerts, steering wheel grip strength, hazard light engagement, and geographic location.

* * * * *